United States Patent Office 3,468,925
Patented Sept. 23, 1969

3,468,925
PREPARATION OF 2-AMINOETHYLTHIOSUL-
FATES BY REACTION OF THIOSULFURIC
ACID WITH AN AZIRIDINE
Stanley J. Brois, Matawan, N.J., assignor to Esso Research
and Engineering Company, a corporation of Delaware
No Drawing. Filed May 2, 1966, Ser. No. 546,578
Int. Cl. C07c *119/04, 121/42*
U.S. Cl. 260—453          8 Claims

ABSTRACT OF THE DISCLOSURE 2-aminoethylthiosulfates, also known as Bunte salts, can be conveniently prepared by reacting an aziridine with thiosulfuric acid at low temperatures, such as −60° to 0° C., in the presence of a suitable solvent, such as methanol.

The present invention relates to 2-aminoethylthiosulfates, also designated as Bunte salts. In general, it concerns an improved process for preparing 2-aminoethylthiosulfates and to novel compounds comprising 2-aminoethylthiosulfates. In particular, the present invention relates to a novel process for preparing 2-aminoethylthiosulfates and compounds having the following general formula:

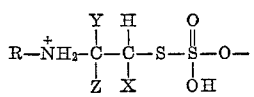

where R is an organo radical generally selected from the group consisting of hydrogen, alkyl, cycloalkyl, aryl alkyl or aryl radicals; the alkyl radical may contain functional groups which include but are not limited to amine, nitrile, ester, carbamate, guanidine, ketone, hydrazone, semicarbazone, and urea substituents. Letters X, Y and Z are the same or different and may be selected from the group consisting of hydrogen, alkyl or aryl radicals.

In a broad aspect of this invention, there is provided a process for preparing 2-aminoethylthiosulfates which comprises adding an aziridine to thiosulfuric acid and reacting them at low temperatures in a suitable solvent system.

In a more specific embodiment of this invention, there is further provided a process for preparing 2-aminoethylthiosulfates which comprises adding an aziridine to thiosulfuric acid and reacting them at low temperatures in a suitable solvent system and recovering the reaction product with a solvent miscible with the reaction solvent system.

Briefly, the process of the present invention involves reacting an aziridine with thiosulfuric acid at low temperatures, e.g., between about −60° to 0° C. in a suitable solvent, e.g., methanol.

The term aziridine as employed herein is a generic term covering ethylenimine and ethylenimine derivatives. Aziridines suitable for use in the present invention may be represented by the following formula:

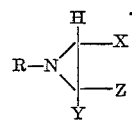

where R, X, Y and Z are as defined above.

Examples of suitable ethylenimine derivatives include but are not limited to alkyl and aryl aziridines and N-aziridyl alkyl amines, esters, nitriles, carbamates, guanidines, ketones, hydrazones, semicarbazones, and ureas.

The thiosulfuric acid reactant employed in the process of the present invention has the formula: $H_2S_2O_3$. The preparation of thiosulfuric acid is well known in the art [M. Schmidt, Z. anorg. M. Allgem. Chem., 289, 141 (1957); M. Schmidt and M. Wieber, ibid., 326, 174 (1963)] and per se forms no basis of the present invention. A preferred method of preparing the thiosulfuric acid used as a reactant in the present invention involves treating ammonium thiosulfate with sulfuric acid in methanol at about −60° C., according to the following equation:

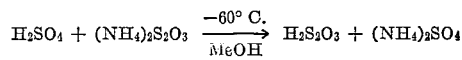

Thiosulfuric acid is readily separated from the $(NH_4)_2SO_4$ by filtration. Diethyl ether or the like may be added to the reaction mixture to facilitate the filtration and/or stabilize the thiosulfuric acid. It is to be understood, however, that any method of preparing the thiosulfuric acid may be employed in the present invention.

While it is not intended that the following limits the present invention in any respect, it is believed that the reaction between aziridine and thiosulfuric acid precedes according to the mechanism below.

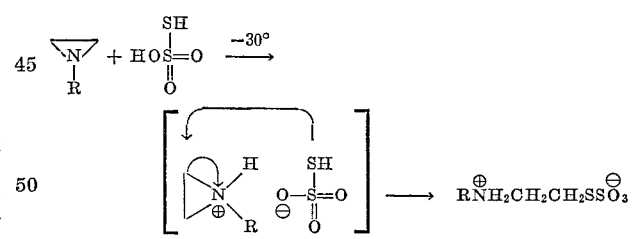

In general, the process of the present invention involves the dropwise addition of an aziridine diluted in a suitable solvent to an equivalent amount of dilute methanolic thiosulfuric acid at a temperature of about −60° to about 0° C., preferably about −30° C. The inverse addition tends to induce the polymerization of the aziridine reactant. After the addition of the aziridine is complete, the reaction medium is allowed to warm to room temperature.

As the reaction medium is brought to room temperature, the product may precipitate from solution. Quantitative recovery of the product is usually assured by adding an excess of ether to the mixture. When the thiosulfate salt, by virtue of its structure remains in solution at room temperature, the addition of ether or other suitable solvents miscible with the reaction solvent will ordinarily precipitate the salt from solution. The product can be recrystallized from methanol, filtered, washed and dried in vacuo at about 25° to 100° C. for varying periods depending on the stability of the Bunte salt.

The thiosulfates may be recrystallized under mild conditions from a variety of solvent or solvent mixtures including acetic acid, methanol, methanol-water, methanol-ether, ethanol, ethanol-water, N,N-dimethylformamide (DMF), DMF-$H_2O$, DMF-methanol, DMF-ether, N,N-dimethylacetamide, dimethylsulfoxide and the like. The choice of a solvent for recrystallization will, of course, be contingent on the stability and solubility of the thiosulfate salt.

Suitable solvents for the aziridine include methanol, ethanol, ether, tetrahydrofuran, acetone, acetonitrile, N,N-dimethylformamide, N,N-dimethylacetamide, 1-methyl-2-pyrrolidinone, dimethylsulfoxide and the like. Obviously, the choice of solvent for the aziridine will depend upon the solubility characteristics of the particular aziridine reactant employed.

While methanol and methanol-ether mixtures are preferred solvent systems for thiosulfuric acid, other inert solvents or solvent mixtures miscible with the acid may be employed. Such solvents or solvent mixtures include ethanol, ethanol-ether, acetonitrile, tetrahydrofuran, acetone, acetone-ether, N,N-dimethylformamide (DMF), DMF-ether, dimethylsulfoxide (DMSO), DMSO-ether, and the like. Generally, homogeneous reactions and facile product recovery can be realized with the appropriate choice of the above-described solvents.

In one particular embodiment of the present invention, ammonium salts of the 2-aminoethylthiosulfates can be easily prepared by the addition of ammonia to the internal salt in a suitable solvent at temperatures of $-20°$ to about 25° C. The formation of the ammonium 2-aminoethylthiosulfates may in some instances enhance the stability, increase the water solubility and simplify the isolation of the internal Bunte salt.

The present invention can be further described by reference to the following examples. It is to be understood, however, that the examples are for purposes of illustration only and are not intended to limit the scope of the present invention in any respect.

EXAMPLE 1

Into a 4 liter, 4-neck round bottom flask equipped with a mechanical stirrer, thermometer, dropping funnel and a $-78°$ condenser, is placed 163.0 gm. of ammonium thiosulfate and 950 ml. of methanol. The suspension is then cooled to $-40°$ under a slight stream of nitrogen.

One mole of 98% sulfuric acid (53.5 ml.) is added dropwise over a period of approximately 45 minutes at $-40°$ C. The colorless suspension is then stirred vigorously for an additional 2 hours at $-40°$ C. At the end of 2 hours, 500 ml. of diethyl ether, previously chilled to $-40°$, is added. The suspension is then stirred vigorously for 45 minutes. The reaction mixture is cooled to approximately $-70°$ and vacuum filtered into a two-liter suction flask that is immersed in a $-70°$ bath. The precipitate is washed with approximately 400 ml. of cold methanol. The volume of the filtrate is noted. The methanolic solution is kept as cold as possible prior to reacting it. Prolonged storage, ca. 8–12 hours, even at $-40°$ results in decomposition of the $H_2S_2O_3$.

Assuming 100% reaction, a .05 mole aliquot of the methanolic solution is kept at $-40°$ C. and 30% ammonium hydroxide is added dropwise with stirring until the mixture is basic. It is then allowed to reach room temperature and is titrated with a 1.0 N $I_2$ solution using starch solution as an indicator. The titration is complete when the yellow end-point persists for 30 seconds. The above preparative method usually affords thiosulfuric acid in about 80% yield.

To a four-necked round bottom flask equipped with stirrer, thermometer, addition funnel and condenser containing 0.1 mole of thiosulfuric acid in approximately 200 ml. of methanol-ether solution was added dropwise 0.1 mole of ethylenimine dissolved in approximately 200 ml. of methanol. The reaction mixture was maintained at about $-30°$ C. During aziridine addition, a white precipitate begins to form. Upon completion of the aziridine addition the reaction mixture was allowed to warm up to room temperature and stirred for about ½ hour. The solid product was filtered off and recrystallized from water-methanol solution. A quantitative yield of 2-aminoethylthiosulfate, M.P. 193–194° C., was obtained. The infrared spectrum was identical to authentic 2-aminoethylthiosulfate.

EXAMPLE 2

In accordance with the procedure described in Example 1, 0.1 mole of N-t-butylaziridine dissolved in ca. 200 ml. of methanol was added dropwise to a methanol-ether solution of 0.1 mole thiosulfuric acid maintained at about $-30°$ C. When the aziridine addition was complete, the reaction mixture was allowed to warm up to 25° C. The copious, white precipitate which separated from solution was filtered, washed several times with ether and dried in vacuo at 25°. A quantitative yield of 2-t-butylaminoethylthiosulfate was obtained. After recrystallization from hot methanol, the Bunte salt melted at 243° C. with decomposition.

*Analysis.*—Calculated for $C_6H_{15}NS_2O_3$: C, 33.78; N, 6.56; S, 30.06. Found: C, 33.80; N, 6.39; S, 30.36.

The process of the present invention affords several important advantages over the conventional synthetic routes to Bunte salts. For example, the conventional synthesis of 2-aminoethylthiosulfate salts involves the acid catalyzed reaction of aziridine with sodium thiosulfate ($Na_2S_2O_3$) [F. C. Schaefer, J. T. Geoghegan, D. W. Kaiser, J. Am. Chem. Soc., 77, 5918 (1955); D. Rosenthal, G. Brandrup, K. Davis, Jr. and M. Wall, J. Org. Chem., 30, 3689 (1965)]. In the prior art processes, the limited solubility of $Na_2S_2O_3$ requires that reactions with this nucleophilic salt be carried out in water solution. Thus, only water soluble aziridines or their precursors, namely, 2-haloethylamine hydrohalides can be employed in the conventional synthesis if heterogeneous reaction masses are to be avoided. Moreover, acid reagents such as hydrochloric acid, sulfuric acid, etc. when added to catalyze the reaction between the aziridine and the sodium thiosulfate tend to promote aziridine polymerization. Finally, the isolation and purification of the labile thiosulfate salt produced by the conventional synthesis present serious difficulties. For example, the separation of water soluble 2-aminoethylthiosulfates from inorganic salt by-products such as sodium chloride or sodium sulfate, is usually a laborious operation. Moreover, purification by repetitive recrystallization or by such elaborate techniques as ion exchange chromatography and countercurrent distribution generally afford low yields of analytically pure 2-aminoethylthiosulfate salts.

In contrast, the process of the present invention which employs thiosulfuric acid in a suitable solvent, for example, methanol at relatively low temperatures, for example, $-30°$ C. avoids all of the shortcomings of the above-mentioned conventional methods of synthesizing 2-aminoethylthiosulfates and, in addition, enables the synthesis of novel 2-aminoethylthiosulfates which novel compounds could not practically be synthesized by conventional methods.

EXAMPLE 3

Alkyl and aryl substituted 2-aminoethylthiosulfates were prepared in high yields using the same general procedure of the present invention as set forth in Examples 1 and 2. Several of the compounds thus obtained and recrystallized from methanol-water solution are shown in Table I, above.

EXAMPLE 4

Monoester and diester substituted 2-aminoethylthiosulfates were prepared in high yields according to the present invention. The ester substituted Bunte salts were readily recrystallized from methanol-water or ethanol-water solutions. In general, the methods set forth in Examples 1 and 2 were employed. The compounds obtained in this manner are shown in Table II.

TABLE I.—ALKYL AND ARYL-SUBSTITUTED BUNTE SALTS

| Salt | M.P. (° C.) | | Analyses | | |
|---|---|---|---|---|---|
| | | | C | N | S |
| $\overset{+}{N}H_3\overset{Me}{\underset{|}{C}}HCH_2SSO_3^-$ | 225 | Theory | 21.04 | 8.18 | 37.45 |
| | | Found | 21.28 | 8.32 | 37.66 |
| $\overset{+}{N}H_3\overset{Me}{\underset{\underset{Me}{|}}{C}}CH_2SSO_3^-$ | 260 (d.) | Theory | 25.93 | 7.56 | 34.62 |
| | | Found | 26.39 | 7.53 | 34.72 |
| $\overset{+}{N}H_3\overset{Et}{\underset{|}{C}}HCH_2-SSO_3^-$ | 224 (d.) | Theory | 25.93 | 7.56 | 34.62 |
| | | Found | 25.93 | 7.64 | 34.59 |
| $Me_3C\overset{+}{N}H_2CH_2CH_2SSO_3^-$ | 243 (d.) | Theory | 33.78 | 6.56 | 30.53 |
| | | Found | 33.80 | 6.38 | 30.36 |
| $NCCH_2CH_2\overset{+}{N}H_2CH_2CH_2SSO_3^-$ | 188 | Theory | 28.56 | 13.32 | 30.50 |
| | | Found | 28.58 | 13.59 | 29.97 |
| $i\text{-}Pr\overset{+}{N}H_2CH_2CH_2SSO_3^-$ | 198 | Theory | 30.13 | 7.02 | 32.17 |
| | | Found | 30.15 | 7.04 | 32.58 |
| $\overset{+}{N}H_3CH_2\overset{Ph}{\underset{|}{C}}HSSO_3^-$ | 205 | Theory | 41.18 | 6.00 | 27.48 |
| | | Found | 40.87 | 6.12 | 27.71 |
| $i\text{-}Pr\overset{+}{N}H_2CH_2\overset{Ph}{\underset{|}{C}}HSSO_3^-$ | 190–192 | Theory | 47.97 | 5.08 | 23.28 |
| | | Found | 47.61 | 5.25 | 23.05 |
| $n\text{-}Bu\overset{+}{N}H_2CH_2\overset{Ph}{\underset{|}{C}}HSSO_3^-$ | 203 | Theory | 49.80 | 4.83 | 22.15 |
| | | Found | 49.89 | 4.97 | 22.64 |
| $\overset{+}{N}H_3\overset{Me}{\underset{|}{C}}H\overset{Ph}{\underset{|}{C}}HSSO_3^-$ DL-erythro | 295 | Theory | 43.70 | 5.66 | 25.92 |
| | | Found | 43.78 | 5.84 | 26.21 |
| $Me\overset{+}{N}H_2\overset{Ph}{\underset{|}{C}}H\overset{}{\underset{\underset{Me}{|}}{C}}H-SSO_3^-$ (a) D(+) threo | 191–192 | Theory | 45.95 | 5.35 | 24.53 |
| | | Found | 46.09 | 5.43 | 24.82 |
| $Me\overset{+}{N}H_2\overset{Me}{\underset{|}{C}}H\overset{Ph}{\underset{|}{C}}HSSO_3^-$ (b) L(−) erythro | 240–242 | Theory | 45.95 | 5.35 | 24.53 |
| | | Found | 46.02 | 5.76 | 24.13 |
| $Ph\overset{+}{N}H_2CH_2CH_2SSO_3^-$ | 173–175 | Theory | 41.18 | 6.00 | 27.49 |
| | | Found | 40.95 | 6.29 | 27.23 |
| quinolinyl-$\overset{+}{N}H_2CH_2SSO_3^-$ (c) | 220 | Theory | 46.46 | 9.85 | 22.55 |
| | | Found | 46.40 | 9.99 | 22.20 |

(a) $[\alpha]_D^{20}$ +233.8 (C=0.214, H₂O), 4 decimeter tube.
(b) $[\alpha]_D^{20}$ −182.6 (C=0.230, H₂O), 4 decimeter tube.
(c) Recrystallized from N,N-dimethylformamide.

TABLE II.—MONO AND DIESTER ANALOGS OF 2-AMINOETHYLTHIOSULFATE $R-\overset{+}{N}H_2CH_2CH_2SSO_3^-$

| R | M.P. (°C.) | | C | N | S |
|---|---|---|---|---|---|
| MeOC(O)CH$_2$— | 145 | Theory | 26.19 | 6.10 | 27.96 |
| | | Found | 25.80 | 6.35 | 28.31 |
| EtOC(O)CH$_2$— | 120 | Theory | 29.62 | 5.75 | 26.36 |
| | | Found | 29.42 | 5.73 | 26.72 |
| EtOC(O)CH$_2$CH$_2$— | 146–148 | Theory | 32.67 | 5.44 | 24.92 |
| | | Found | 32.72 | 5.08 | 25.20 |
| MeOC(O)CH$_2$CH(CH$_3$)— | 110–112 | Theory | 32.67 | 5.44 | 24.92 |
| | | Found | 32.85 | 5.64 | 25.01 |
| EtOC(O)CH$_2$CH(CH$_3$)— | 175 | Theory | 35.40 | 5.15 | 23.62 |
| | | Found | 35.62 | 5.40 | 23.39 |
| CF$_3$CF$_2$CH$_2$OC(O)CH$_2$CH$_2$— | 185–187 | Theory | 26.59 | 3.88 | 17.74 |
| | | Found | 26.35 | 3.51 | 17.70 |
| i-BuOC(O)CH$_2$CH$_2$— | 130–132 | Theory | 37.87 | 4.91 | 22.46 |
| | | Found | 37.49 | 5.21 | 22.20 |
| n-BuOC(O)CH$_2$CH$_2$— | 109–110 | Theory | 37.87 | 4.91 | 22.46 |
| | | Found | 37.52 | 4.92 | 22.40 |
| CH$_2$=CHCH$_2$OC(O)CH$_2$CH$_2$— | 139–141 | Theory | 35.67 | 5.20 | 23.81 |
| | | Found | 36.33 | 5.53 | 23.95 |
| HC≡CCH$_2$OC(O)CH$_2$CH$_2$— | 152–154 | Theory | 35.94 | 5.24 | 23.99 |
| | | Found | 36.09 | 5.53 | 23.64 |
| EtOC(O)CH$_2$—CH=C(CH$_3$)CH— | 108–110 | Theory | 40.38 | 4.70 | 21.56 |
| | | Found | 40.37 | 4.65 | 21.40 |
| (tetrahydropyranyl-S)—OC(O)CH$_2$CH$_2$— | 179–181 | Theory | 42.42 | 4.50 | 20.59 |
| | | Found | 42.58 | 4.74 | 20.20 |
| CH$_3$(CH$_2$)$_{11}$OC(O)CH$_2$CH$_2$— | 122–124 | Theory | 51.35 | 3.52 | 16.13 |
| | | Found | 51.16 | 3.96 | 15.91 |
| PhCH$_2$CH$_2$OC(O)CH$_2$CH$_2$— | 128–130 | Theory | 46.82 | 4.20 | 19.23 |
| | | Found | 46.87 | 4.08 | 19.48 |
| EtOC(O)CH—<br>EtOC(O)CH$_2$ | 205–206 | Theory | 36.46 | 4.25 | 19.46 |
| | | Found | 36.57 | 4.29 | 19.55 |
| CH$_2$=CHCH$_2$OC(O)CH—<br>CH$_2$=CHCH$_2$OC(O)CH$_2$ | 202–203 | Theory | 40.78 | 3.96 | 18.14 |
| | | Found | 40.80 | 4.01 | 18.31 |
| i-BuOC(O)CH—<br>i-BuOC(O)CH$_2$ | 193–194 | Theory | 43.61 | 3.63 | 16.63 |
| | | Found | 43.41 | 3.71 | 16.79 |
| n-BuOC(O)CH—<br>n-BuOC(O)CH$_2$ | 200 | Theory | 43.61 | 3.63 | 16.63 |
| | | Found | 43.38 | 3.72 | 17.18 |
| (tetrahydropyranyl-S)—OC(O)CH—<br>(tetrahydropyranyl-S)—OC(O)CH$_2$ | 200–203 | Theory | 49.40 | 3.20 | 14.6 |
| | | Found | 49.60 | 3.36 | 14.5 |

EXAMPLE 5

Ketone hydrazone and semicarbazone substituted 2-aminoethylthiosulfates were prepared in excellent yield using the process of the present invention. Recrystallizations were carried out in methanol and methanol-water solutions. Some of the compounds obtained in this manner are shown in Table III.

EXAMPLE 6

Carbamate, urea, and guanidine substituted 2-aminoethylthiosulfate salts were likewise prepared in high yield according to the present invention. Some of the compounds obtained in this manner are shown in Table IV.

TABLE III.—KETONE, HYDRAZONE AND SEMICARBAZONE ANALOGS OF 2-AMINOETHYLTHIOSULFATE $R\overset{+}{N}H_2CH_2CH_2SSO_3^-$

| R | M.P. (° C.) | | C | H | S |
|---|---|---|---|---|---|
| $MeCCH_2C(Me)_2-$ (O, Me, Me) | 140 | Theory | 37.62 | 5.48 | 25.11 |
| | | Found | 37.35 | 5.79 | 25.51 |
| 4-Me-4-(Me$_2$C–)cyclohexanone | 153-155 | Theory | 46.72 | 4.54 | 20.79 |
| | | Found | 46.66 | 4.24 | 20.97 |
| $PhCCH_2-$ (O) | 205 | Theory | 43.60 | 5.08 | 23.27 |
| | | Found | 43.78 | 5.06 | 23.77 |
| $PhCCH(PhCCH_2)-$ (a) | 208-210 | Theory | 54.94 | 3.55 | 16.29 |
| | | Found | 54.70 | 3.35 | 16.75 |
| $CH_3C(=NNH_2)-CH_2C(CH_3)_2-$ | 131-133 | Theory | 35.67 | 7.11 | 23.80 |
| | | Found | 35.81 | 6.97 | 24.02 |
| $CH_3C(=NNHCNHC(CH_3)_3)-CH_2CH_2-$ | 162-164 (d.) | Theory | 38.86 | 7.11 | 18.83 |
| | | Found | 39.00 | 7.24 | 18.86 |
| $CH_3C(=NNHCNHC(CH_3)_3)-CH_2-C(CH_3)_2-$ (b) | 155-157 | Theory | 42.37 | 7.66 | 17.40 |
| | | Found | 42.48 | 7.50 | 17.36 |
| $CH_3C(=NNHCNHPh)-CH_2CH_2-$ (c) | 164-166 | Theory | 43.32 | 5.59 | 17.79 |
| | | Found | 43.37 | 5.50 | 17.90 |
| $CH_3C(=NNHCNH-2,6-Et_2C_6H_3)-CH_2C(CH_3)_2-$ | 157-159 | Theory | 51.32 | 7.26 | 14.42 |
| | | Found | 51.22 | 7.33 | 14.70 |

(a) Recrystallized from N,N-dimethylformamide.
(b) Nitrogen analysis, Theory, 15.20; Found, 15.20.
(c) Nitrogen analysis, Theory, 15.54; Found, 15.89.

TABLE IV.—CARBAMATE, UREA, AND GUANIDINE ANALOGS OF 2-AMINO ETHYLTHIOSULFATE $R\overset{+}{N}H_2CH_2CH_2SSO_3^-$

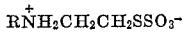

| R | M.P. (° C.) | | C | H | S |
|---|---|---|---|---|---|
| $(CH_3)_3CNHCOCH_2CH_2-$ | 192-194 | Theory | 35.98 | 6.71 | 21.35 |
| | | Found | 35.50 | 6.63 | 21.20 |
| $EtO-C_6H_4-NHCOCH_2CH_2-$ | 193-196 | Theory | 42.84 | 5.53 | 17.51 |
| | | Found | 43.02 | 5.50 | 17.39 |

TABLE IV—Continued

| Salt | M.P. (° C.) | | Analyses C | N | S |
|---|---|---|---|---|---|
| $(CH_3)_3CNHCNHCH_2CH_2-$ (a) [with C=O] | 176–178 | Theory<br>Found | 36.10<br>36.06 | 7.07<br>7.00 | 21.42<br>21.40 |
| $Ph_2NCNHCH_2CH_2-$ [with C=O] | 200–202 | Theory<br>Found | 51.63<br>51.04 | 5.35<br>5.36 | 16.21<br>16.06 |
| naphthyl-$NHCNH(CH_2)_6-$ [with C=O] | 192–194 | Theory<br>Found | 53.62<br>53.80 | 6.40<br>6.44 | 15.07<br>15.36 |
| $(CH_3)_2CHN=C(NHCH(CH_3)_2)NHCH_2CH_2-$ (b) | 190–192 | Theory<br>Found | 40.46<br>40.38 | 8.03<br>8.14 | 19.64<br>20.06 |
| $(CH_3)_2CHN=C(NHCH(CH_3)_2)NHCH_2CH_2CH_2-$ (c) | 196–198 | Theory<br>Found | 42.33<br>42.17 | 8.29<br>8.54 | 18.83<br>18.88 |
| (2,6-dimethylphenyl)N=C(NH-2,6-dimethylphenyl)NHCH_2CH_2CH_2- | 153–155 | Theory<br>Found | 42.02<br>55.64 | 6.46<br>6.44 | 14.69<br>14.79 |

(a) Nitrogen analysis, Theory, 14.03; Found, 14.46.
(b) Nitrogen analysis, Theory, 17.16; Found, 17.34.
(c) Nitrogen analysis, Theory, 16.46; Found, 16.58.

It is apparent from the above examples that the present invention, in addition to providing an improved method of synthesizing 2-aminoethylthiosulfates, also provides novel derivatives of said compound.

The utility of the process of the present invention is apparent to those skilled in the art from the above discussion. The products of the present invention, as will be apparent to those skilled in the art, will have utility as reactive intermediates for the synthesis of other useful chemical compounds [B. Milligan and J. M. Swan, Reviews of Pure and Applied Chemistry, 12, 72 (1962)]. For example, Bunte salts are hydrolyzed to the corresponding thiols in hot, dilute acids, thus providing useful route to mercaptans. The thiosulfates are readily oxidized to disulfides, or under more vigorous conditions to sulfuric acids or their derivatives. Reaction of Bunte salts with cyanide in aqueous solution gives the corresponding thiocyanates. The present invention will have further utility in synthesizing antiradiation and antiarthritic agents.

It is to be further understood that the present invention is not limited to the specific examples which have been offered merely as illustrations. Other derivatives can be prepared and modifications may be made without departing from the spirit of the invention.

What is claimed is:

1. A process for preparing 2-aminoethylthiosulfates which comprises adding an aziridine to thiosulfuric acid and reacting them at low temperatures in an inert, miscible solvent system.

2. A process according to claim 1 wherein the temperature is between —60° C. and 0° C.

3. A process according to claim 1 wherein aziridine in a solvent is added dropwise to a methanol-ether solution of thiosulfuric acid.

4. A process according to claim 1 wherein the temperature is about —30° C.

5. A process according to claim 1 wherein the aziridine is ethylenimine.

6. A process according to claim 1 wherein said aziridine is a compound of the formula:

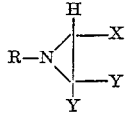

where R is an organo radical selected from the group consisting of hydrogen, alkyl, cycloalkyl, aralkyl, and aryl radicals; and X, Y, and Z are selected from the group consisting of hydrogen, alkyl, and aryl radicals.

7. A process for preparing 2-aminoethylthiosulfates which comprises adding an aziridine to thiosulfuric acid and reacting them at low temperatures in an inert, miscible solvent system and recovering the reaction product by recrystallization with a solvent miscible with the reaction solvent system.

8. A process for preparing 2-aminoethylthiosulfates which comprises adding an aziridine to thiosulfuric acid and reacting them at low temperatures in a methanol-ether solvent system.

References Cited

Schickh et al.: Chemical Abstracts, vol. 52, p. 19,951
Klayman et al.: Chemistry and Industry, vol. 38, p. 1632, 1965.
Ethylenimine, Dow Chemical Co., 1963, p. 4.

CHARLES B. PARKER, Primary Examiner
S. T. LAWRENCE III, Assistant Examiner

U.S. Cl. X.R.

23—166, 167; 260—239, 288, 454, 465.5 471, 481, 482, 553, 563, 564, 566, 570.5, 578, 999